(12) United States Patent
Tsuji

(10) Patent No.: US 9,244,675 B2
(45) Date of Patent: Jan. 26, 2016

(54) INFORMATION PROCESSING APPARATUS CAPABLE OF UPDATING FIRMWARE THEREOF AND CONTROL METHOD AND STORAGE MEDIUM THEREFOR

(75) Inventor: Hiroyuki Tsuji, Toride (JP)

(73) Assignee: CANON KABUSHIKI KAISHA (JP)

( * ) Notice: Subject to any disclaimer, the term of this patent is extended or adjusted under 35 U.S.C. 154(b) by 638 days.

(21) Appl. No.: 13/454,129

(22) Filed: Apr. 24, 2012

(65) Prior Publication Data
US 2012/0272084 A1    Oct. 25, 2012

(30) Foreign Application Priority Data

Apr. 25, 2011   (JP) ................. 2011-097296

(51) Int. Cl.
G06F 1/32      (2006.01)
G06F 9/44      (2006.01)
G06F 9/445     (2006.01)

(52) U.S. Cl.
CPC ............. *G06F 8/665* (2013.01); *G06F 1/3284* (2013.01); *Y02B 60/1267* (2013.01); *Y02B 60/183* (2013.01)

(58) Field of Classification Search
CPC ..... G06F 1/3284; G06F 8/665; Y02B 60/183; Y02B 60/1267
See application file for complete search history.

(56) References Cited

U.S. PATENT DOCUMENTS

| 8,451,477 | B2 * | 5/2013 | Takahashi et al. ........... 358/1.15 |
| 8,612,965 | B2 | 12/2013 | Sakai |
| 2005/0135306 | A1 | 6/2005 | McAllen et al. |
| 2007/0236734 | A1 | 10/2007 | Okamoto |
| 2011/0035739 | A1 | 2/2011 | Harada |
| 2013/0074061 | A1 * | 3/2013 | Averbuch et al. ............. 717/171 |
| 2013/0125107 | A1 * | 5/2013 | Bandakka et al. ............ 717/171 |

FOREIGN PATENT DOCUMENTS

| JP | 2007-011944 A | 1/2007 |
| JP | 2009006590 A | 1/2009 |
| JP | 2009177686 A | 8/2009 |
| JP | 2010198332 A | 9/2010 |
| JP | 2011034503 A | 2/2011 |

OTHER PUBLICATIONS

Extended European Search Report for corresponding EP 12165282.0, mail date Mar. 25, 2013.
Japanese Office Action cited in Japanese counterpart application No. JP2011-097296, dated Dec. 16, 2014.
Korean Office Action in KR1020120039594, dated Sep. 5, 2014.
Office Action issued in KR10-2012-0039594, mailed Jul. 28, 2015.

(Continued)

*Primary Examiner* — M Elamin
(74) *Attorney, Agent, or Firm* — Rossi, Kimms & McDowell LLP

(57) ABSTRACT

An information processing apparatus capable updating firmware thereof, while reducing power consumption. In a case where an image forming apparatus as an information processing apparatus is in a power switch off mode in which a power switch operable by a user is kept turned off and where a setting to permit execution of firmware update has been set by the user, the image forming apparatus stops power supply for execution of processing other than processing performed by a network I/F. When a firmware update request is received by the network I/F, the image forming apparatus restores power supply for execution of firmware update.

9 Claims, 14 Drawing Sheets

(56) References Cited

OTHER PUBLICATIONS

The Automatic Update for the Window Systems, http://windows.microsoft.com/ko-kr/windows-vista/Understanding-Windows-automatic-updating?ca9c3ae8 and https://ko.wikipedia.org/w/index.php?title=%EC%9C%88%EB%8F%84_7 & oldid=14467923. 2009. Printed on Jul. 28, 2015.
Office Action issued in CN201210124187.7, mailed Aug. 3, 2015. English translation provided.

* cited by examiner

FIG.6A

| ITEM | VALUE (Hex) | LENGTH |
|---|---|---|
| DESTINATION ETHER ADDRESS | ff:ff:ff:ff:ff:ff | 6 |
| TRANSMISSION SOURCE ETHER ADDRESS | Don't Care | 6 |
| FRAME TYPE | 0806(ARP) | 2 |
| HARD TYPE | 1(Ether) | 2 |
| PROTOCOL TYPE | 0800(IP ADDRESS) | 2 |
| HARD SIZE | 6 | 1 |
| PROTOCOL SIZE | 4 | 1 |
| OPERATION | 1(ARP Request) | 2 |
| TRANSMISSION SOURCE ETHER ADDRESS | Don't Care | 6 |
| TRANSMISSION SOURCE IP ADDRESS | Don't Care | 4 |
| TARGET ETHER ADDRESS | Don't Care | 6 |
| TARGET IP ADDRESS | OWN IP ADDRESS | 4 |
| TOTAL | | 42 |

FIG.6B

| ITEM | VALUE (Hex) | LENGTH |
|---|---|---|
| DESTINATION ETHER ADDRESS | COUNTERPART MAC ADDRESS (VARIABLE) | 6 |
| TRANSMISSION SOURCE ETHER ADDRESS | OWN MAC ADDRESS (FIXED) | 6 |
| FRAME TYPE | 0806(ARP) | 2 |
| HARD TYPE | 1(Ether) | 2 |
| PROTOCOL TYPE | 0800(IP ADDRESS) | 2 |
| HARD SIZE | 6 | 1 |
| PROTOCOL SIZE | 4 | 1 |
| OPERATION | 2(ARP Request) | 2 |
| TRANSMISSION SOURCE ETHER ADDRESS | OWN MAC ADDRESS (FIXED) | 6 |
| TRANSMISSION SOURCE IP ADDRESS | OWN IP ADDRESS (FIXED) | 4 |
| TARGET ETHER ADDRESS | COUNTERPART MAC ADDRESS (VARIABLE) | 6 |
| TARGET IP ADDRESS | COUNTERPART IP ADDRESS (VARIABLE) | 4 |
| TOTAL | | 42 |

FIG.6C

| ITEM | VALUE (Hex) | LENGTH |
|---|---|---|
| DESTINATION ETHER ADDRESS | OWN MAC ADDRESS (FIXED) | 6 |
| TRANSMISSION SOURCE ETHER ADDRESS | MONITORING UNIT MAC ADDRESS (FIXED) | 6 |
| FRAME TYPE | 0800(IP) | 2 |
| HARD TYPE | 1(Ether) | 2 |
| PROTOCOL TYPE | 0800(IP ADDRESS) | 2 |
| HARD SIZE | 6 | 1 |
| PROTOCOL SIZE | 4 | 1 |
| OPERATION | Don't Care | 2 |
| TRANSMISSION SOURCE ETHER ADDRESS | MONITORING UNIT MAC ADDRESS (FIXED) | 6 |
| TRANSMISSION SOURCE IP ADDRESS | MONITORING UNIT IP ADDRESS (FIXED) | 4 |
| TARGET ETHER ADDRESS | Don't Care | 6 |
| TARGET IP ADDRESS | OWN IP ADDRESS | 4 |
| TOTAL | | 42 |

FIG.11

SETTING/REGISTRATION

<REGULAR UPDATE>

- REGULAR UPDATE SETTING: [ON] [OFF]  IF DISTRIBUTION IS SCHEDULED, SETTING IS MADE INEFFECTIVE UNTIL COMPLETION OF DISTRIBUTION

- UPDATE TIME  IT SOMETIMES TAKES 3 HOURS AT MAXIMUM FROM SETTING TIME TO COMPLETE CONFIRMATION

CHECK TIME [EVERY WEEK] [SUNDAY] [2] O'CLOCK (0~23)

VALID TIME [23] O'CLOCK (0~23)  AFTER CONFIRMATION, THIS WILL BE APPLIED AFTER COMPLETION OF DOWNLOAD

[× CANCEL]   [OK ↵]

FIG.12

- DEVICE ID
- CURRENT FIRM COMPONENT INFORMATION LIST
  - FIRM TYPE
  - FIRM VERSION
- ACQUISITION INFORMATION
  - ACQUISITION TYPE (WHOLE/PARTICULAR/LATEST)
  - ADDITIONAL SET ACQUISITION MODE (ALL/ONLY INDISPENSABLE ONES)
  - PARTICULAR FIRM ACQUISITION INFORMATION
    - ID
    - PASSWORD
  - OPERATOR CLASSIFICATION (SERVICEMAN/USER/REGULAR UPDATE)
  - COUNTRY INFORMATION OPERATING ON DEVICE
    - LANGUAGE CODE
    - COUNTRY CODE
  - AREA CODE FOR LOCATION OF DEVICE

FIG.13

- FIRM INFORMATION LIST
  - BASIC SET INFORMATION
  - BASIC SET ID
  - FIRM GROUP VERSION
  - FIRM LABEL

INFORMATION PROCESSING APPARATUS CAPABLE OF UPDATING FIRMWARE THEREOF AND CONTROL METHOD AND STORAGE MEDIUM THEREFOR

BACKGROUND OF THE INVENTION

1. Field of the Invention

The present invention relates to an information processing apparatus capable of updating firmware thereof and relates to a control method and a storage medium therefor.

2. Description of the Related Art

An information processing apparatus such as an image forming apparatus is required to update firmware thereof for example when the version of the firmware is upgraded or when a failure occurs in the apparatus. Conventionally, the firmware is updated manually by a serviceman visiting a customer, and this increases costs for firmware update.

Thus, there has been developed a technique for updating firmware by storing firmware transmitted via the Internet into a rewritable storage device such as a flash memory.

More specifically, a system has been developed in which firmware update is reserved by a monitoring system that remotely monitors the operation state of an image forming apparatus, or in which a server is periodically accessed by an image forming apparatus to check whether or not the latest version of firmware is available. For example, Japanese Laid-open Patent Publication No. 2007-11944 discloses a technique in which an image forming apparatus per se communicates via the Internet with a server that holds firmware, and downloads a firmware program from the server. With this technique, it is possible to distribute firmware during night time zone where the image forming apparatus is not in use by a user.

However, power supply to the image forming apparatus is generally turned off during the time zone where the image forming apparatus is not in use, and hence the image forming apparatus cannot communicate with the server and cannot download firmware therefrom. On the other hand, if power supply to the image forming apparatus is kept on during the time zone where the apparatus is not in use, the resultant power consumption becomes large.

In a case where the administrator wishes to prohibit the image forming apparatus to perform network printing and FAX reception during the night time zone, power supply to the apparatus is generally disconnected. To enable the image forming apparatus to download the firmware during the night time zone, power supply to the apparatus cannot be disconnected, which poses a problem.

SUMMARY OF THE INVENTION

The present invention provides an information processing apparatus capable of updating firmware thereof, while reducing power consumption of the apparatus, and provides a control method and a storage medium therefor.

According to one aspect of this invention, there is provided an information processing apparatus operable in either a first power mode or in a second power mode and comprising a reception unit configured to receive a packet, an update unit configured to execute firmware update processing based on a firmware update request, a power supply unit configured to supply power to both the reception unit and the update unit in a case where the information processing apparatus operates in the first power mode and configured not to supply power to the update unit but supply power to the reception unit in a case where the information processing apparatus operates in the second power mode, and a determination unit configured to determine whether or not the packet received by the reception unit is a packet representing the firmware update request, wherein the power supply unit supplies power to the update unit in a case where the information processing apparatus operates in the second power mode and the determination unit determines that the packet received by the reception unit is a packet representing the firmware update request, and the power supply unit does not supply power to the update unit in a case where the information processing apparatus operates in the second power mode and the determination unit determines that the packet received by the reception unit is other than the packet representing the firmware update request.

With this invention, it is possible to update firmware of the information processing apparatus, while reducing power consumption of the apparatus.

Further features of the present invention will become apparent from the following description of an exemplary embodiment with reference to the attached drawings.

BRIEF DESCRIPTION OF THE DRAWINGS

FIGS. 6A to 6C are views showing example network packets, where FIG. 6A shows an ARP request packet, FIG. 6B shows an ARP response packet, and FIG. 6C shows a firmware update request packet from the monitoring unit;

FIG. 11 is a view showing a regular update setting screen displayed on an operation unit of each image forming apparatus;

FIG. 12 is a view showing contents of SOAP data transmitted from each image forming apparatus to the distribution server;

FIG. 13 is a view showing contents of SOAP data transmitted from the distribution server to the image forming apparatus;

DESCRIPTION OF THE EMBODIMENTS

The present invention will now be described in detail below with reference to the drawings showing a preferred embodiment thereof.

Figure 1:
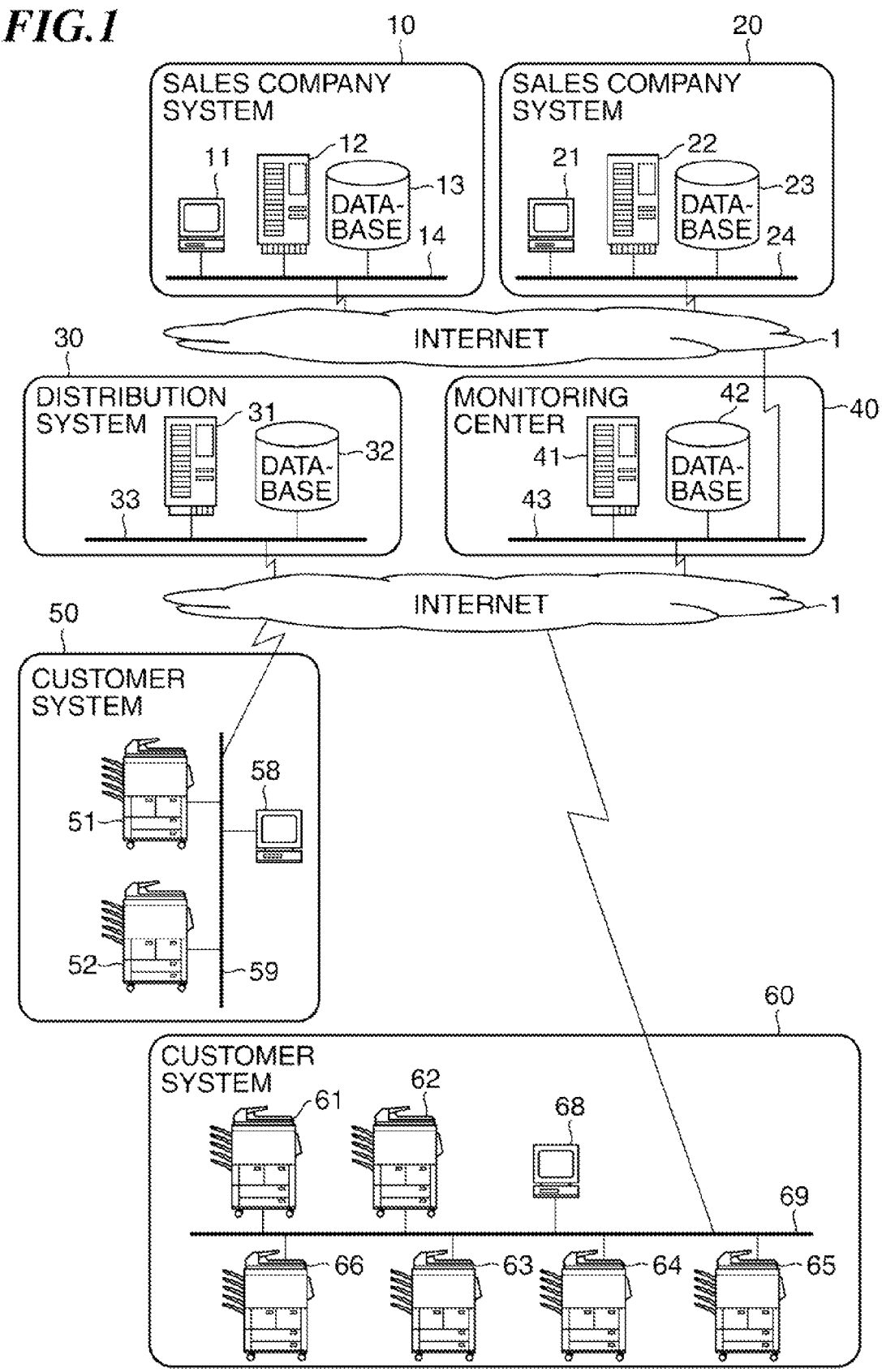
FIG. 1 is a view showing the entirety of a management system including image forming apparatuses serving as information processing apparatuses according to one embodiment of this invention.

FIG. 1 shows the entirety of a management system including image forming apparatuses serving as information processing apparatuses according to one embodiment of this invention.

Referring to FIG. 1, the management system includes a plurality of sales company systems (among which two sales company systems are denoted at 10, 20 in FIG. 1), a distribution system 30, a monitoring center 40, and a plurality of customer systems (among which two customer systems are denoted at 50, 60 in FIG. 1), and these elements of the management system are connected to the Internet 1. It should be noted that in the following description, the plurality of sales company systems and the plurality of customer systems will be sometimes referred to as the sales company systems 10, 20 and the customer systems 50, 60, respectively.

The sales company system 10 includes a host 12, a database 13 that stores sales information about locations and customers managed by the sales company system 10 and information about the management system, and a PC 11 that controls data registration into the database 13, data correction, etc. and that accesses a web site provided by a monitoring center host 41 of the monitoring center 40 to perform data browsing, etc. The PC 11, host 12, and database 13 are each connected to a LAN 14. It should be noted that the host 12 can have an operation unit and a display unit and can achieve the functions of the PC 11.

The sales company system 20 includes a host 22, database 23, and PC 21 each connected to a LAN 24 and respectively corresponding to the host 12, database 13, and PC 11.

It should be noted that each of the sales company systems 10, 20 is constituted by plural elements in the example shown in FIG. 1, but this is not limitative. For example, the databases 13, 23 can physically be provided in respective ones of the hosts 12, 22 or can be provided at locations remote from the sales company systems 10, 20 so long as they can be accessed from the hosts 12, 22 through the Internet 1. The sales company systems 10, 20 can each be constituted by elements all of which are provided in an intranet. In short, each sales company system can be constituted by plural elements or a single element.

The monitoring center 40 is interposed between the sales company systems and the customer systems, and includes the monitoring center host 41 and a database 42 each connected to a LAN 43 that can be connected with the Internet 1. It should be noted that the database 42 can physically be provided in the monitoring center host 41 or can be provided at a location remote from the monitoring center 40 so long as it can be accessed from the host 41 through the Internet 1.

The monitoring center host 41 collects, from monitoring units (two of which are denoted at 58, 68 in FIG. 1) of the plurality of customer systems, information about image forming apparatuses to be monitored (which are provided in the customer systems and some of which are denoted at 51, 52 and 61 to 66 in FIG. 1) and information representing operation states of these image forming apparatuses. The monitoring center host 41 stores and processes the collected information, and provides an alert to external devices (e.g., the hosts 12, 22 of the sales company systems 10, 20), where required. It should be noted that in the following description, the monitoring units and the image forming apparatuses of the plurality of customer systems will be sometimes referred to as the monitoring units 58, 68 and the image forming apparatuses 51, 52 and 61 to 66, respectively.

The database 42 serves as a history storage unit that stores information used for the monitoring and stores counter information of the image forming apparatuses, failure history information, failure pattern table, etc. collected from the customer systems.

As the operation states of each image forming apparatus, there can be mentioned, for example, out of toner, door-open, drum replacement, no cartridge, cooling fan operation error, circuit board error, stained document mounting glass, no staple, deficient in quantity of sheet feed sensor light, font memory overflow, rendering error, fixing device error, counter error, double-sided printing unit error, and paper jamming.

As the counter information, there can be mentioned, for example, billing counter information according to which bill will be charged by the sales company, division counter information collected for respective divisions of the customer, size-by-size counter information collected for respective sheet sizes, and component counter information indicating the level of consumption of each component of the image forming apparatus.

The billing counter information indicates the number of prints printed by the image forming apparatus. The division counter information indicates the number of prints printed in respective divisions. The component counter information indicates the total number of rotations of a component such as a drum, the total operation time of a component such as a scanner lamp, or the like.

The hosts of the sales company systems (e.g., the hosts 12, 22 of the sales company systems 10, 20) can register into the monitoring center host 41 information about image forming apparatuses to be monitored and settings for the monitoring. The monitoring center host 41 can merge and collectively manage the information about the image forming apparatuses to be monitored and the settings for the monitoring, which are registered by the hosts of the sales company systems. The monitoring center host 41 can set the settings for the monitoring to the monitoring units 58, 68 of the customer systems.

The management system provides services based on contracts made between sales companies and customers, and monitors only image forming apparatuses to be monitored (which are determined by the sales companies based on the contracts). The monitoring center host 41 provides a web page (on which information stored in the database 42 can be browsed) to PCs connected to the monitoring center host 41 through the Internet 1. The contents that can be browsed on the web page are restricted through user authentication on a per sales company basis, customer basis, and user right basis. It should be noted that some part of the information stored in the database 42 can be changed from the web page.

The distribution system 30 is interposed between the sales company systems and the customer systems, and includes the distribution server 31 (the details of which will be described later) and a database 32 serving as a history storage unit that stores firmware, application, software license information, etc. that are to be distributed to image forming apparatuses of the customer systems. The distribution server 31 and the database 32 are connected to a LAN 33 that can be connected to the Internet 1. It should be noted that the database 32 can physically be provided in the distribution server 31 or can be provided at a location remote from the distribution system 30 so long as it can be accessed from the distribution server 31 through the Internet 1.

In FIG. 1, there are only shown one monitoring center 40 having the monitoring center host 41 and the database 42 and one distribution system 30 having the distribution server 31 and the database 32. However, there is a case where a plurality of monitoring centers and a plurality of distribution systems are provided to achieve dispersal processing in order to disperse loads generated when pieces of information are collected from many image forming apparatuses and monitoring units or when firmwares are distributed to many image forming apparatuses.

Next, a description will be given of constructions of customer systems. In FIG. 1, there are shown customer systems 50, 60. The customer system 50 includes image forming apparatuses 51, 52 each connected to a LAN 59 of a business office X of a company A, which is in turn connected to the Internet 1, and includes a monitoring unit 58 connected to the LAN 59 for monitoring the image forming apparatuses 51, 52.

The customer system 60 includes image forming apparatuses 61 to 66 each connected to a LAN 69 of a business office Y of the company A, which is in turn connected to the Internet 1, and includes a monitoring unit 68 connected to the LAN 69 for monitoring the image forming apparatuses 61 to 66.

The monitoring units 58, 68 of the customer systems 50, 60 collect information from respective ones of the image forming apparatuses 51, 52 and 61 to 66, and process the collected information, where required. The monitoring units 58, 68 store the collected information and the processed information into respective ones of databases (not shown) connected to LANs 59, 69. Settings for the monitoring of image forming apparatuses are also stored in the databases. It should be noted that these databases can be provided at locations remote from the customer systems 50, 60 so long as they can be accessed from the monitoring unit 58, 68 through the Internet 1.

The monitoring units 58, 68 can communicate with the monitoring center host 41 via the Internet 1, and can transmit to the monitoring center host 41 information representing the state of each of corresponding image forming apparatuses (e.g., failure occurrence information) upon reception of such information from any of these image forming apparatuses. It should be noted that the web page provided by the monitoring center host 41 can be browsed from the monitoring units 58, 68.

In the management system of this embodiment, HTTP/SOAP protocol can be used in the communication via the Internet 1. SOAP (Simple Object Access Protocol) is an XML (extended Markup Language) based protocol for calling data or service from a computer to another computer. In this embodiment, the SOAP is implemented on HTTP. In the communication by the SOAP, a SOAP message including an XML document added with associated information is exchanged. Accordingly, a computer that supports the SOAP includes a SOAP message generation unit for generating a SOAP message and a SOAP message interpretation unit for interpreting the SOAP message. In this embodiment, information about the operation state of each image forming apparatus is contained in the SOAP message for transmission to the monitoring center host 41.

Each of the image forming apparatuses of the customer systems 50, 60 communicates with the monitoring center host 41 through the monitoring unit 58 or 68, as previously described. However, the settings can be changed such that the image forming apparatuses can communicate with the monitoring center host 41 without intervention of the monitoring units 58, 68.

Figure 2:
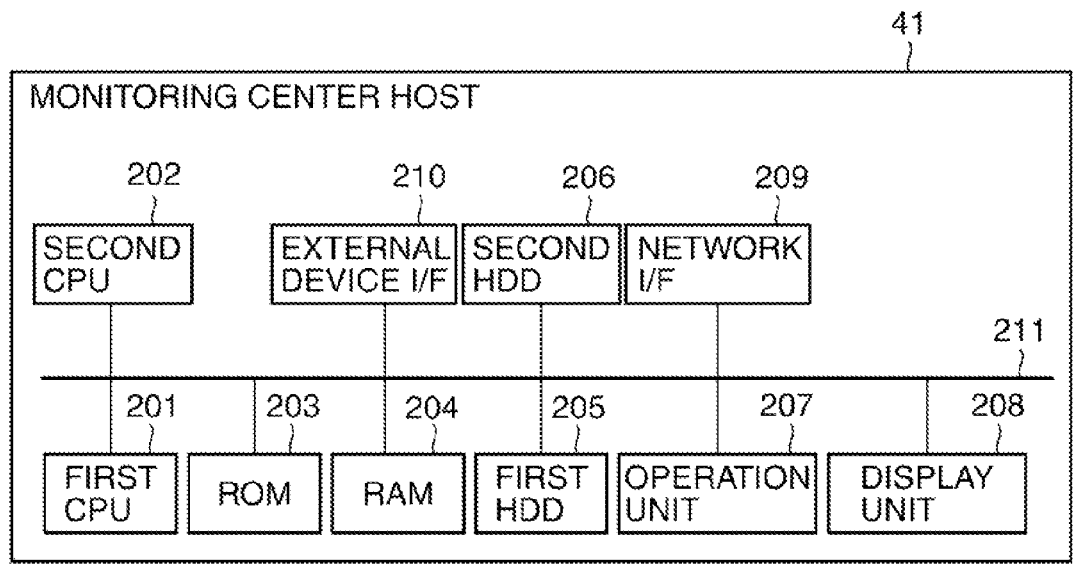
FIG. 2 is a block diagram showing a hardware structure of a monitoring center host in the management system.

FIG. 2 shows a hardware structure of the monitoring center host 41.

It should be noted that each of the distribution server 31 and the hosts 12, 22 has the same hardware structure as that of the monitoring center host 41 shown in FIG. 2.

Referring to FIG. 2, the monitoring center host 41 includes first and second CPUs 201, 202 that control the entirety of the host 41, a ROM 203 that stores programs and data relating to processes performed by the host 41, and a RAM 204 that stores temporary data relating to the processes performed by the host 41.

The monitoring center host 41 also includes first and second HDDs 205, 206 that store programs and data relating to the processes performed by the host 41, temporary data, information about image forming apparatuses to be monitored, information collected from these image forming apparatuses, etc. For example, component counter information, billing counter information, division counter information, and the like are stored in the HDDs 205, 206.

The monitoring center host 41 further includes an operation unit 207 having a keyboard and a pointing device that accept an instruction input, a display unit 208 that displays the operation state of the monitoring center host 41 and information output from each of programs running on the host 41, a network I/F 209 that exchanges information with an external device through the LAN 43 connected to the Internet 1, and an external device I/F 210 connected with an external storage device or the like. These elements 201 to 210 are connected to a system bus 211 for data exchange.

Figure 3:
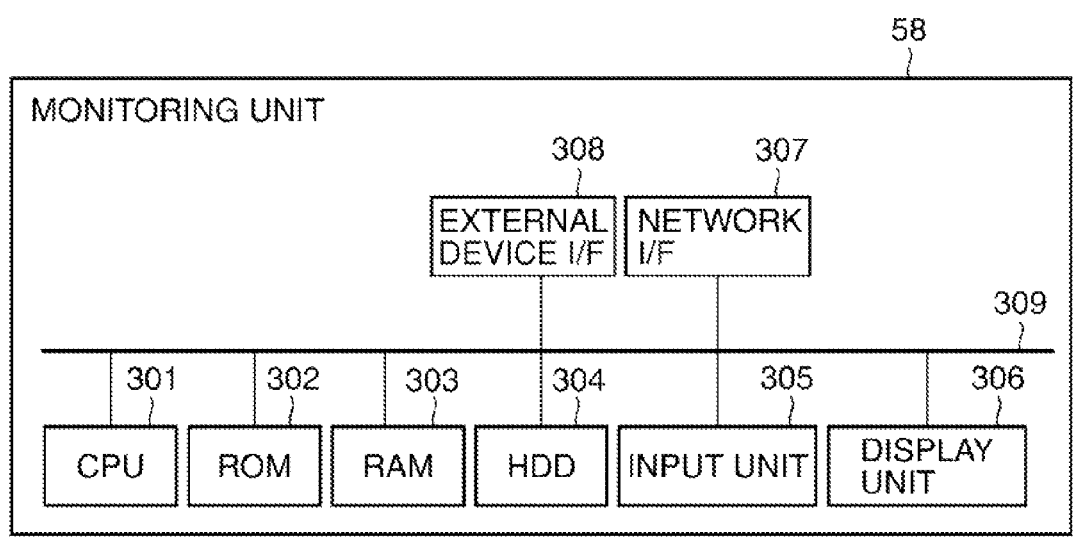
FIG. 3 is a block diagram showing a hardware structure of a monitoring unit of each of customer systems in the management system.

FIG. 3 shows a hardware structure of the monitoring unit 58 of the customer system 50. The monitoring unit 68 of the customer system 60 has the same hardware structure as the monitoring unit 58. Each of the monitoring units 58, 68 monitors firmwares currently applied to image forming apparatuses disposed in the business office X or Y of the company A, downloads the latest firmware applicable to at least one of the image forming apparatuses from the distribution server 31, and distributes the downloaded firmware to one or more image forming apparatuses. To this end, each of the monitoring units 58, 68 polls the monitoring center host 41 at regular time intervals or at a set time point to acquire information, and accesses the distribution server 31 and downloads the latest firmware therefrom when determining that firmware stored in the distribution server 31 should be newly applied to at least one of the image forming apparatuses.

As shown in FIG. 3, the monitoring unit 58 includes a CPU 301 that controls processes performed by the monitoring unit 58, a ROM 302 that stores programs and data relating to the processes performed by the monitoring unit 58, and a RAM 303 that stores temporary data relating to the processes performed by the monitoring unit 58.

The monitoring unit 58 also includes an HDD 304 that stores programs and data relating to the processes performed by the monitoring unit 58, temporary data, information about image forming apparatuses to be monitored, information collected from these image forming apparatuses, and the like.

The monitoring unit 58 further includes an input unit 305 having a keyboard and a pointing device that accept an instruction input, a display unit 306 that displays the operation state of the monitoring unit 58 and information output from each of programs running on the monitoring unit 58, a network I/F 307 that exchanges information with an external device through a LAN connected to the Internet 1, and an external device I/F 308 connected with an external storage device or the like. These elements 301 to 308 are connected to a system bus 309 for data exchange.

Figure 4:
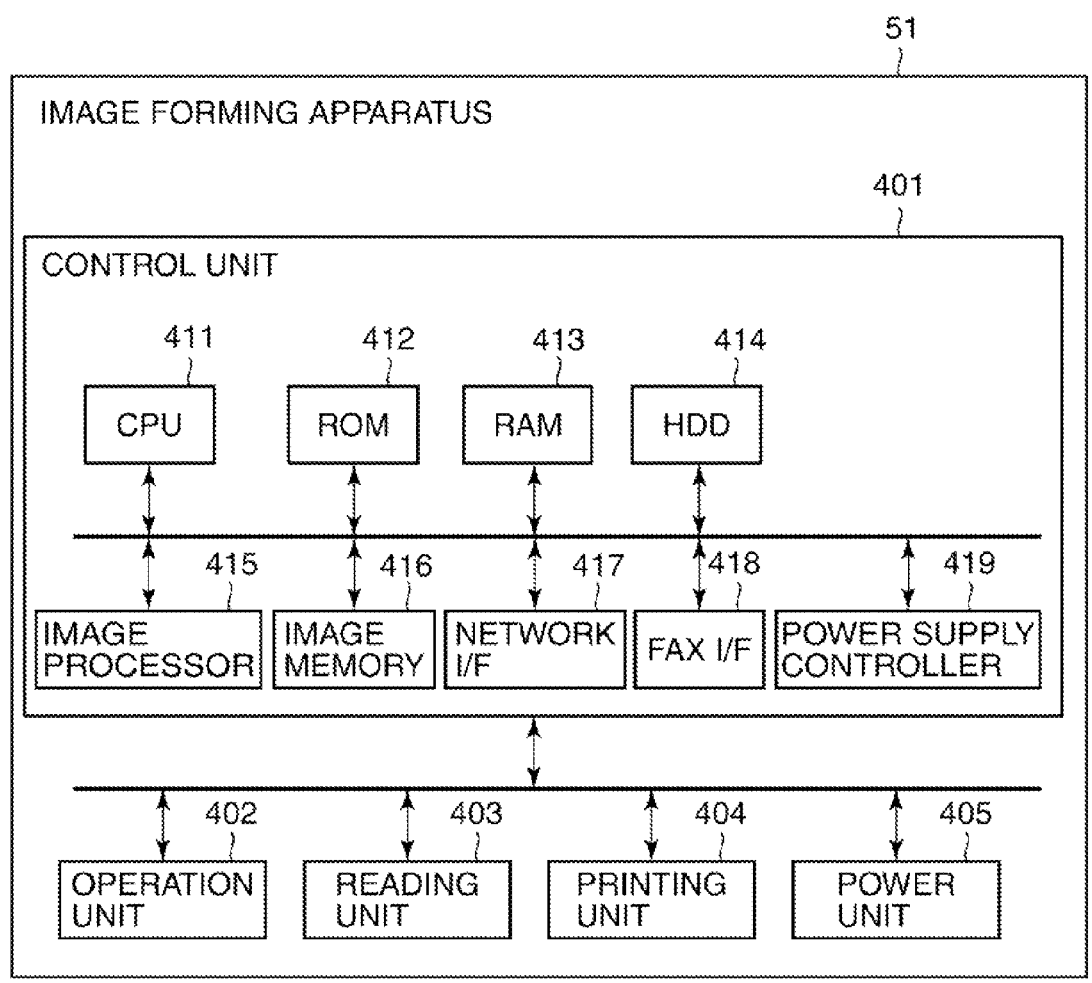
FIG. 4 is a block diagram showing a hardware structure of one of image forming apparatuses of the customer systems.

FIG. 4 shows a hardware structure of the image forming apparatus 51 of the customer system 50. It should be noted that the image forming apparatus 52 of the customer system 50 and the image forming apparatuses 61 to 66 of the customer system 60 each have the same hardware structure as the image forming apparatus 51.

The image forming apparatus 51 includes a control unit 401 that controls an operation unit 402, reading unit 403, printing unit 404, and power unit 405. The details of the control unit 401 will be described later. The operation unit 402 has a display device that provides an operation screen for a user, an input device that accepts user's operations for the image forming apparatus 51, and switches or buttons for switching the operation state of the image forming apparatus 51 between a power saving state (i.e., sleep state) and a standby state. The reading unit 403 reads an image of an original, converts the read image into image data, and outputs the image data to the control unit 401. Based on the image data processed by the control unit 401, the printing unit 404 forms an image on an output sheet. In the standby state, the power unit 405 supplies electric power to the control unit 401, operation unit 402, reading unit 403, and printing unit 404.

The control unit 401 includes a CPU 411 that controls the operation unit 402, reading unit 403, printing unit 404, and power unit 405 and controls respective parts of the control unit 401 based on a program developed in a RAM 413.

The control unit 401 also includes a ROM 412 that stores, e.g., a boot program executed by the CPU 411. An OS or an application program or the like stored in an HDD 414 for execution by the CPU 411 is developed in the RAM 413.

The control unit 401 further includes an image processor 415 that performs various image processing on image data stored in an image memory 416. The image memory 416 temporarily stores image data input from the reading unit 403 or from a network I/F 417 or from a FAX I/F 418. The network I/F 417 inputs and outputs image data, etc. from and to an external device such as a PC. The FAX I/F 418 inputs and outputs fax data through a public line (not shown). A power supply controller 419 switches a state of power supply from the power unit 405 to the operation unit 402, reading unit 403, and printing unit 404 and to respective parts of the control unit 401.

Figure 5:
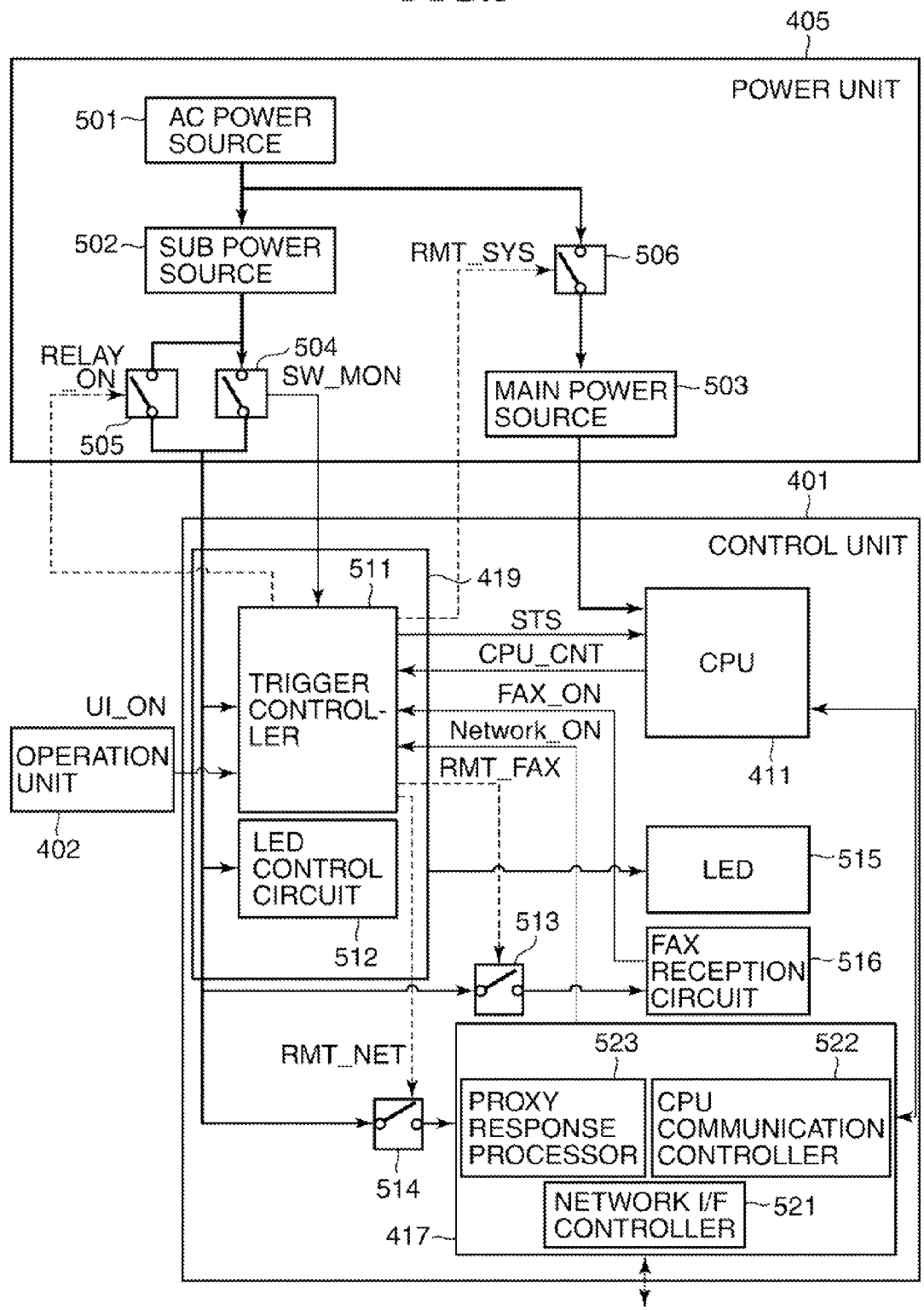
FIG. 5 is a block diagram showing a structure for control of power supply from a power unit to a control unit in each image forming apparatus.

FIG. 5 shows a structure for control of power supply from the power unit 405 to the control unit 401 in each image forming apparatus.

In FIG. 5, bold solid lines with arrows indicate power supply paths, dotted lines with arrows indicate power supply control signals, and fine solid lines with arrows indicate control signals other than the power supply control signals.

An AC power source 501 of the power unit 405 supplies power to a sub power source 502, and supplies power to a main power source 503 through a relay switch 506. The sub power source 502 supplies power to respective parts of the power supply controller 419 and to a FAX reception circuit 516 and the network I/F 417 through a power switch 504 and a relay switch 505.

The power switch 504 can be switched ON and OFF by a user. In accordance with ON and OFF of the power switch 504, a SW_MON signal is output to a trigger controller 511. The relay switch 505 is switched ON and OFF according to a RELAY_ON signal supplied from the trigger controller 511. When the power switch 504 is turned OFF, the relay switch 505 controls power supply to the control unit 401 such that a predetermined shutdown process can be performed.

The main power source 503 supplies power to the CPU 411 and to circuits (not shown) of the image forming apparatus. The relay switch 506 is switched ON and OFF according to an RMT_SYS signal supplied from the trigger controller 511. It should be noted that it is possible to supply power from the main power source 503 through a relay switch (not shown) to the operation unit 402, reading unit 403, and printing unit 404 and to respective parts of the control unit 401.

The trigger controller 511 detects input of a CPU_CNT signal from the CPU 411, a UI-ON signal from the operation unit 402, a Network_ON signal from the network I/F 417, a FAX_ON signal from the FAX reception circuit 516, or a SW_MON signal from the power switch 504. The trigger controller 511 outputs a RELAY_ON signal, RMT_SYS signal, RMT_FAX signal, or RMT_NET signal to thereby switch the corresponding relay switch 505, 506, 513, or 514 to ON or OFF. An LED control circuit 512 can control the ON/OFF and blinking of an LED 515. In the blinking control, a hardware circuit of the LED control circuit 512 controls the LED 515 to turn on and off at intervals of, e.g., 0.5 sec. The CPU 411 outputs a CPU_CNT signal to control the trigger controller 511 and receives a status signal STS from the trigger controller 511.

The FAX reception circuit 516 detects fax reception via the public line and outputs a FAX_ON signal to the trigger controller 511.

The network I/F 417 is constituted by a network I/F controller 521, CPU communication controller 522, and proxy response processor 523.

The network I/F controller 521 controls packet transmission and reception through the network. The CPU communication controller 522 transmits and receives data to and from the CPU 411.

The network I/F controller 521 always grasps whether the image forming apparatus operates in either a normal power mode or in a power saving mode. The network I/F controller 521 transfers a packet received from the network to the CPU 411 when the image forming apparatus operates in the normal power mode, and transfers a packet received from the network to the proxy response processor 523 when the image forming apparatus operates in the power saving mode.

The proxy response processor 523 operates only when the image forming apparatus operates in the power saving mode. The proxy response processor 523 classifies a received packet into three categories of packet (i.e., a "packet to be discarded" category, a "packet to be transferred to the CPU 411" category, and a "packet to be proxy-responded" category). The packet classified into the "packet to be discarded" category is a packet that can be ignored (i.e., to which no response is required) such as a packet not addressed to the corresponding image forming apparatus. The received packet of this category is discarded.

The packet classified into the "packet to be transferred to the CPU 411" category is a packet to be subjected to some processing that cannot be done solely by the proxy response processor 523. When receiving such a packet, the proxy response processor 523 outputs a Network_ON signal to the trigger controller 511 which in turn outputs a RMT_SYS signal to turn on the relay switch 506, whereby the main power source 503 is turned on. Thus, the image forming apparatus is returned from the power saving mode to the normal power mode, and the received packet is transferred to the CPU 411.

The packet classified into the "packet to be proxy-responded" category is a packet for which a response is made by the proxy response processor 523 instead of by the CPU 411. When receiving such a packet, the proxy response processor 523 transmits a predetermined packet as a response.

FIGS. 6A to 6C show example network packets. FIG. 6A shows an ARP (Address Resolution Protocol) request packet, FIG. 6B shows an ARP response packet, and FIG. 6C shows a firmware update request packet from each of the monitoring units 58, 68.

The ARP request packet is a packet that is first transmitted in TCP/IP communication.

When the ARP request packet shown in FIG. 6A is input, the input packet is determined as a packet to which a proxy response should be made by the proxy response processor 523, and packet data such as the ARP response packet shown in FIG. 6B is transmitted.

In an update reservation power off mode (described later), only a firmware update request packet from the monitoring unit 58 or 68 such as one shown in FIG. 6C is determined as a packet to be transferred to the CPU 411. Other packets (e.g., ARP request packet) are each processed as a packet to be discarded, even if addressed to the corresponding image forming apparatus.

It should be noted that although in this embodiment only the firmware update request packet received from the monitoring unit 58 or 68 is set as a packet to be transferred to the CPU 411 in the update reservation power off mode, a packet that includes an address specifying the monitoring unit 58 or 68 can be set as a packet to be transferred to the CPU 411.

Figure 7:
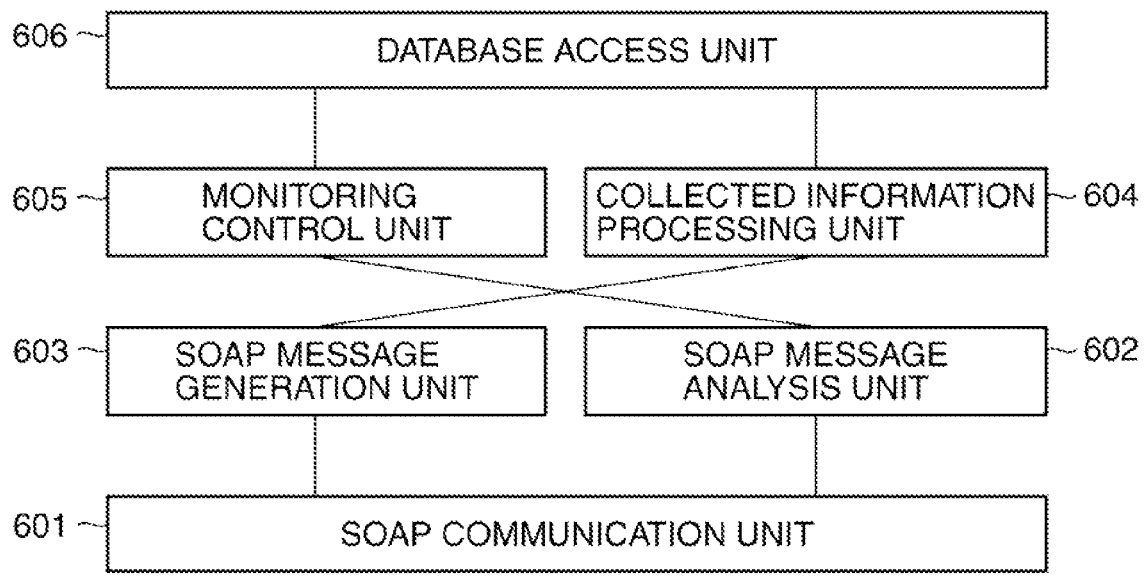
FIG. 7 is a view showing a software structure of that portion of each of the monitoring center host and a distribution server in the management system which relates to the embodiment.

FIG. 7 shows a software structure of that portion of each of the monitoring center host 41 and the distribution server 31 which relates to this embodiment.

As shown in FIG. 7, each of the monitoring center host 41 and the distribution server 31 includes a SOAP communication unit 601 that receives SOAP data from the monitoring unit 58 or 68 through the network I/F 209 and delivers the received data to a SOAP message analysis unit 602. The SOAP communication unit 601 also receives SOAP data generated by a SOAP message generation unit 603 and transmits the received data to the monitoring unit 58 or 68 through the network I/F 209.

Each of the monitoring center host 41 and the distribution server 31 also includes a collected information processing unit 604 that receives information from the monitoring unit 58 or 68 and processes the received information, where required. The processing unit 604 stores the received information or the processed information into the database 42 or 32 through a database access unit 606.

The collected information processing unit 604 achieves functions of a remote monitoring system. For example, based on information received from the monitoring unit 58 or 68 and data stored in the database 42 or 32, the collected information processing unit 604 notifies a result of collection of counter information, error information, and the latest firmware information to a serviceman in charge or to a customer's administrator.

Each of the monitoring center host 41 and the distribution server 31 further includes a monitoring control unit 605 that controls a schedule for acquisition of information about the monitoring unit 58 or 68, a monitoring content, and a monitoring method. The monitoring control unit 605 transmits an instruction to the monitoring unit 58 or 68 through the SOAP message generation unit 603, SOAP communication unit 601, and network I/F 209, where required.

Figure 8:
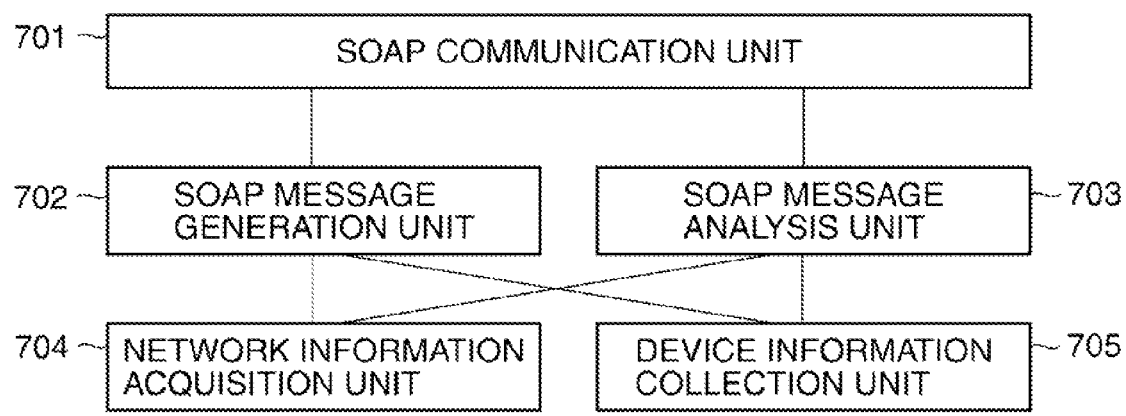
FIG. 8 is a view showing a software structure of that portion of each of the image forming apparatuses which relates to the embodiment.

FIG. 8 shows a software structure of that portion of each of the image forming apparatuses 51, 52 and 61 to 66 which relates to this embodiment.

As shown in FIG. 8, each image forming apparatus includes a SOAP communication unit 701 that receives SOAP data from the monitoring center host 41 or from the distribution server 31 through the network I/F 417 and delivers the received data to a SOAP message analysis unit 703. The SOAP communication unit 701 also receives SOAP data generated by a SOAP message generation unit 702 and transmits the received data to the monitoring center host 41 or to the distribution server 31 through the network I/F 417.

Each image forming apparatus also includes a network information acquisition unit 704 capable of automatically acquiring an IP address, DNS server address, and gateway address in DHCP environment. The network information acquisition unit 704 acquires network information input from the operation unit 402 and then stored into the HDD 414, if such network information is present.

Each image forming apparatus further includes a device information collection unit 705 that acquires counter information held in the information forming apparatus in accordance with a predetermined schedule set in the image forming apparatus or in accordance with an instruction given from the monitoring center host 41. The device information collection unit 705 also acquires pieces of information about service call, jam, out of toner, etc. occurring in the image forming apparatus.

In some cases, the acquired data is delivered as it is to the SOAP message generation unit 702 for transmission to the monitoring center host 41. Otherwise, the acquired data is stored, interpreted, and processed by the device information collection unit 705, and the resultant data is delivered to the SOAP message generation unit 702 for transmission to the monitoring center host 41.

Figure 9:
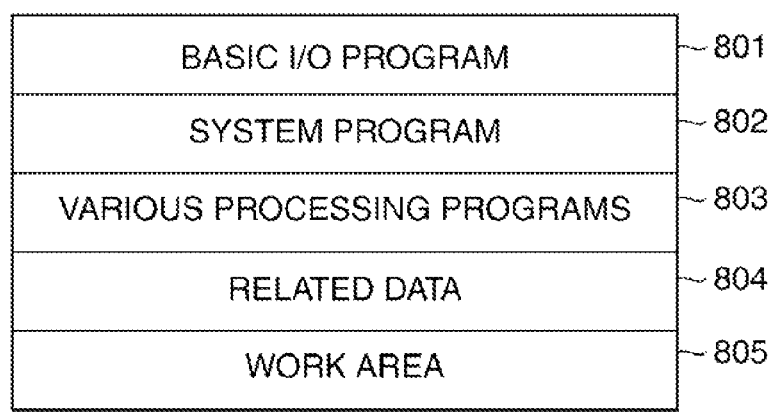
FIG. 9 is a view showing a memory map structure in each of the monitoring center host, distribution server, monitoring unit, and image forming apparatuses.

FIG. 9 shows a memory map structure in each of the monitoring center host 41, distribution server 31, monitoring units 58, 68, and image forming apparatuses 51, 52 and 61 to 66.

To perform a processing program relating to this embodiment, the processing program is loaded into the RAM 204 of the monitoring center host 41, the RAM 303 of the monitoring unit 58 or 68, or the RAM 413 of each image forming apparatus.

As shown in FIG. 9, the memory map is constituted by a basic I/O program 801, system program 802, various processing programs 803 (including the processing program relating to this embodiment), related data storage area 804, and work area 805.

The basic I/O program 801 controls input and output to and from the monitoring center host 41 or the monitoring unit 58 or 68 or each image forming apparatus. The system program 802 provides an operation environment for various processing programs. It should be noted that if the RAM capacity for storing the processing programs, etc. becomes deficient, the first or second HDD 205 or 206 can be used to supplement the RAM 204, the HDD 304 can be used to supplement the RAM 303, and the HDD 414 can be used to supplement the RAM 413.

Figure 10:
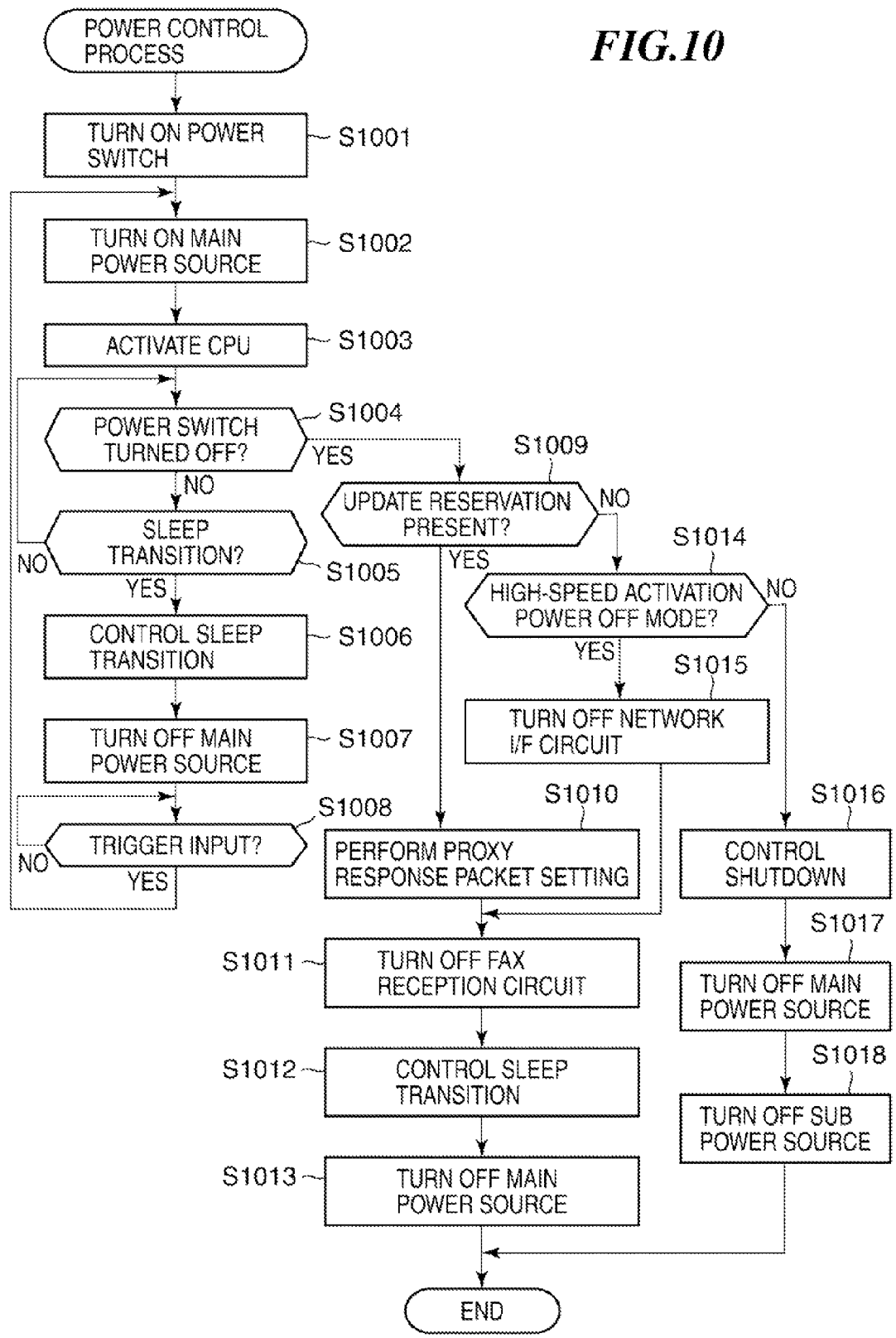
FIG. 10 is a flowchart showing procedures of a power control process performed by each of the image forming apparatuses according to presence or absence of reservation of firmware update.

FIG. 10 shows, in flowchart, procedures of a power control process performed by each of the image forming apparatuses 51, 52 and 61 to 66 according to presence or absence of reservation of firmware update.

In the following, it is assumed that each image forming apparatus operates in either a standby mode, asleep mode, a normal power off mode, a high-speed activation power off mode, or an update reservation power off mode according to a power source operation state.

In the standby mode, electric power is supplied from the main power source 503 and the sub power source 502 to all respective parts of the image forming apparatus. Accordingly, the image forming apparatus is capable of updating firmware.

In the sleep mode, the power switch 504 is at ON and hence power is supplied from the sub power source 502 to the power supply controller 419. Since the relay switches 513, 514 are at ON, power is supplied to the FAX reception circuit 516 and to the network I/F 417. Since the relay switch 506 is at OFF, power supply to the CPU 411 is disconnected. Power supply to the control unit 401, as well as to a part of the operation unit 402, to the reading unit 403, and to the printing unit 404 of the image forming apparatus is also disconnected. In the sleep mode, since power is supplied to the network I/F 417, the image forming apparatus is capable of recognizing a firmware update request packet from the monitoring unit such as one shown in FIG. 6C and capable of updating firmware.

In the normal power off mode, the power switch 504 and the relay switches 505, 506 are at OFF, and hence power supply to all the parts of the image forming apparatus is disconnected. Accordingly, the image forming apparatus is incapable of updating firmware.

In the high-speed activation power off mode, the relay switch 505 is at ON, and hence power is supplied only to the power supply controller 419, with the power supply to the other parts disconnected. In the high-speed activation power off mode, the entire image forming apparatus can be activated at a higher speed than in the normal power off mode when the power switch 504 is turned on by a user since the power supply controller 419 is already supplied with power. It should be noted that in the high-speed activation power off mode, since power supply to the network I/F 417 is disconnected, the image forming apparatus is incapable of recognizing a firmware update request packet from the monitoring unit such as one shown in FIG. 6C and incapable of updating firmware.

The update reservation power off mode (power switch off mode) is a mode in which the power switch 504 is at OFF in a state where firmware update by the distribution server 31 through the monitoring unit is enabled. In the update reservation power off mode, the power switch 504 is at OFF, but the relay switch 505 remains ON, and hence power is supplied to the power supply controller 419. Since the relay switch 514 is at ON, power is supplied also to the network I/F 417. Power supply to the other parts is disconnected. When a shift is made to the update reservation power off mode, the proxy response processor 523 of the network I/F 417 is instructed to determine a firmware update request packet from the monitoring unit such as one shown in FIG. 6C, as a return factor packet (i.e. a packet to be transferred to the CPU 411). It should be noted that in the update reservation power off mode, since power is supplied to the network I/F 417, the image forming apparatus is capable of recognizing a firmware update request packet from the monitoring unit such as one shown in FIG. 6C and capable of updating firmware.

In the power control process shown in FIG. 10, the power switch 504 is turned on by a user (step S1001), whereby power is supplied from the sub power source 502 to the trigger controller 511 and to the LED control circuit 512. The LED control circuit 512 controls the LED 515 to lighten. The trigger controller 511 outputs the RMT_FAX signal, RMT_NET signal, and RELAY_ON signal. Thus, power is supplied to the FAX reception circuit 516 and to the network I/F 417, and the relay switch 505 is turned on.

Next, the RMT_SYS signal is output from the trigger controller 511 to turn on the relay switch 506, whereby the main power source 503 is turned on (step S1002). Then, the CPU 411 is activated (step S1003), and a standby state (standby mode) is established. At that time, if the network I/F 417 is set to reject a packet other than a particular packet, the setting of the network I/F 417 is initialized.

Next, the CPU 411 determines whether or not the power switch 504 is turned off by the user (step S1004). If the answer to step S1004 is YES, the process proceeds to step S1009. On the other hand, if the answer to step S1004 is NO (i.e., if it is determined that the power switch 504 is not turned off), the CPU 411 determines whether or not a sleep transition (i.e., a shift to the sleep mode) should be made (step S1005). The CPU 411 determines that the sleep transition should be made, if for example the image forming apparatus is not operated for a predetermined time period in the standby mode.

It should be noted that the turning off of the power switch 504 by the user in step S1004 is an example of a request to shift the image forming apparatus from a power mode (e.g., sleep mode or standby mode) where the image forming apparatus is capable of updating firmware to a power mode (e.g., normal power off mode or high-speed activation power off mode) where the image forming apparatus is incapable of updating firmware. The request is not limited to one given by turning off the power switch 504. For example, it is possible to detect an occurrence of a request to shift the image forming apparatus from the sleep mode to the normal power off mode or to the high-speed activation power off mode when a predetermined time period has lapsed in the sleep mode. It is also possible to generate a request and to detect an occurrence of the request by using other methods.

If the sleep transition should not be made (i.e., if NO to step S1005), the process returns to step S1004. On the other hand, if the sleep transition should be made (i.e., if YES to step S1005), the CPU 411 controls the sleep transition (step S1006).

The shift to the sleep mode is performed when the CPU 411 detects that a sleep button of the operation unit 402 is pressed by the user or detects that a predetermined time period has lapsed from when the standby mode was entered.

Next, the main power source 503 is turned off (step S1007), whereby the shift is made to the sleep mode (i.e., power saving mode). In the sleep mode, power is supplied to at least the power supply controller 419, and the LED 515 is turned into a lighting state.

Next, the CPU 411 determines whether or not a trigger is input (step S1008). Trigger input occurs when a sleep return button of the operation unit 402 is pressed or when FAX reception is detected or when a print request is given from the network.

If a trigger is input (i.e., if YES to step S1008), the process proceeds to step S1002.

In step S1009, the CPU 411 determines whether or not a setting to make firmware update effective to permit execution of update (hereinafter, sometimes referred to as the update reservation) has been set by the administrator on a setting screen (not shown) before the main power source 503 is turned off. If the update reservation to make firmware update effective has been set (i.e., if YES to step S1009), a shift is made to the update reservation power off mode. To this end, the CPU 411 performs a proxy response packet setting (step S1010). More specifically, a setting is made such that only a packet (FIG. 6C) from the monitoring unit will be determined as a packet to be transferred to the CPU 411 and other packets will be discarded. As a result, in an update reservation state, the image forming apparatus is able to communicate only with the monitoring unit (external device).

Next, the FAX reception circuit 516 is turned off (step S1011). It should be noted that instead of turning off the FAX reception circuit 516, it is possible to make a setting to cause the CPU 411 or the like not to respond to FAX reception.

Further, the CPU 411 transmits the CPU_CNT signal to the trigger controller 511 to give an instruction to stop power supply to the reading unit 403 and to the printing unit 404, thereby controlling a transition to the sleep mode (step S1012). Next, the CPU 411 instructs the trigger controller 511 to output the RMT_SYS signal to the relay switch 506, thereby turning off the main power source 503 (S1013), and completes the present process.

If the update reservation has not been set (i.e., if NO to step S1009), the CPU 411 determines whether or not the high-speed activation power off mode has been set (S1014). It is assumed that the high-speed activation power off mode is set in advance through the operation unit 402 or the like, where required. If the high-speed activation power off mode has been set (i.e., if YES to step S1014), the circuit of the network I/F 417 is turned off (step S1015), so that the network I/F 417 will not accept the input of a network packet for a print job or the like, whereupon the process proceeds to step S1011. Then, as with the case where the update reservation has been set, the CPU 411 turns off the FAX reception circuit (step S1011), controls transition to the sleep mode (step S1012), and turns off the main power source 503 (step S1013), whereby a transition is made to the high-speed activation power off mode. It should be noted that instead of turning off the circuit of the network I/F 417 in step S1015, it is possible to perform only predetermined communication processing (e.g., communication processing that does not directly relate to image forming processing).

If the high-speed activation power off mode has not been set (i.e., if NO to step S1014), the CPU 411 controls shutdown by instructing the trigger controller 511 to output the RMT_SYS signal to the relay switch 506 (step S1016), whereby the main power source 503 is turned off (step S1017). Then, the CPU 411 controls the trigger controller 511 to output the RELAY_ON signal to turn off the relay switch 505, thereby turning off power supply from the sub power source 502 (step S1018). As a result, a transition to the normal power off mode is achieved, and the present process is completed.

According to this embodiment, in a case that the setting to make firmware update effective has been set, power supply from the sub power source 502 to the network I/F 417 is continued, even if the power switch 504 is turned off by the user, and the setting is made such that only the firmware update request packet from the monitoring unit is determined as a return factor packet. As a result, the power supply from the main power source 503 to the CPU 411 can be restarted upon reception of the firmware update request packet from the monitoring unit, even if the power switch 504 is at OFF to turn off the main power source 503. Thus, firmware update processing can be carried out during night time zone where the image forming apparatus is not in use by a user. With the setting to reject reception of a packet other than the firmware update request packet from the distribution server 31 in a state where the power switch 504 is at OFF, the image forming apparatus is not returned to the standby mode, even if fax reception or a print request from the network or the like occurs in the state where the power switch 504 is at OFF, whereby reduction of power consumption can properly be achieved.

FIG. 11 shows a regular update setting screen displayed on the operation unit of each image forming apparatus.

In the setting screen shown in FIG. 11, a regular update setting is set to ON to perform regular update. When the regular update setting is set to ON, it becomes possible to accept settings of check time and valid time. For example, check time is set in terms of date/time and valid time is set in terms of time. In the illustrated example, the check time is every week, Sunday, 23 o'clock and the valid time is 2 o'clock. The setting contents of check time and valid time are registered into the distribution server 31. When the check time is reached, applicable firmware is checked for between the distribution server 31 and the image forming apparatus. More specifically, the firmware of the image forming apparatus is compared with the firmware held in the distribution server 31 to check whether the latest firmware is registered for distribution in the distribution server 31.

To this end, SOAP data having contents shown in FIG. 12 is transmitted from the image forming apparatus to the distribution server 31. If some applicable firmware is registered in the distribution server 31, SOAP data having contents shown in FIG. 13 is transmitted from the distribution server 31 to the image forming apparatus. Subsequently, the applicable firmware is downloaded to the image forming apparatus.

Figure 14:
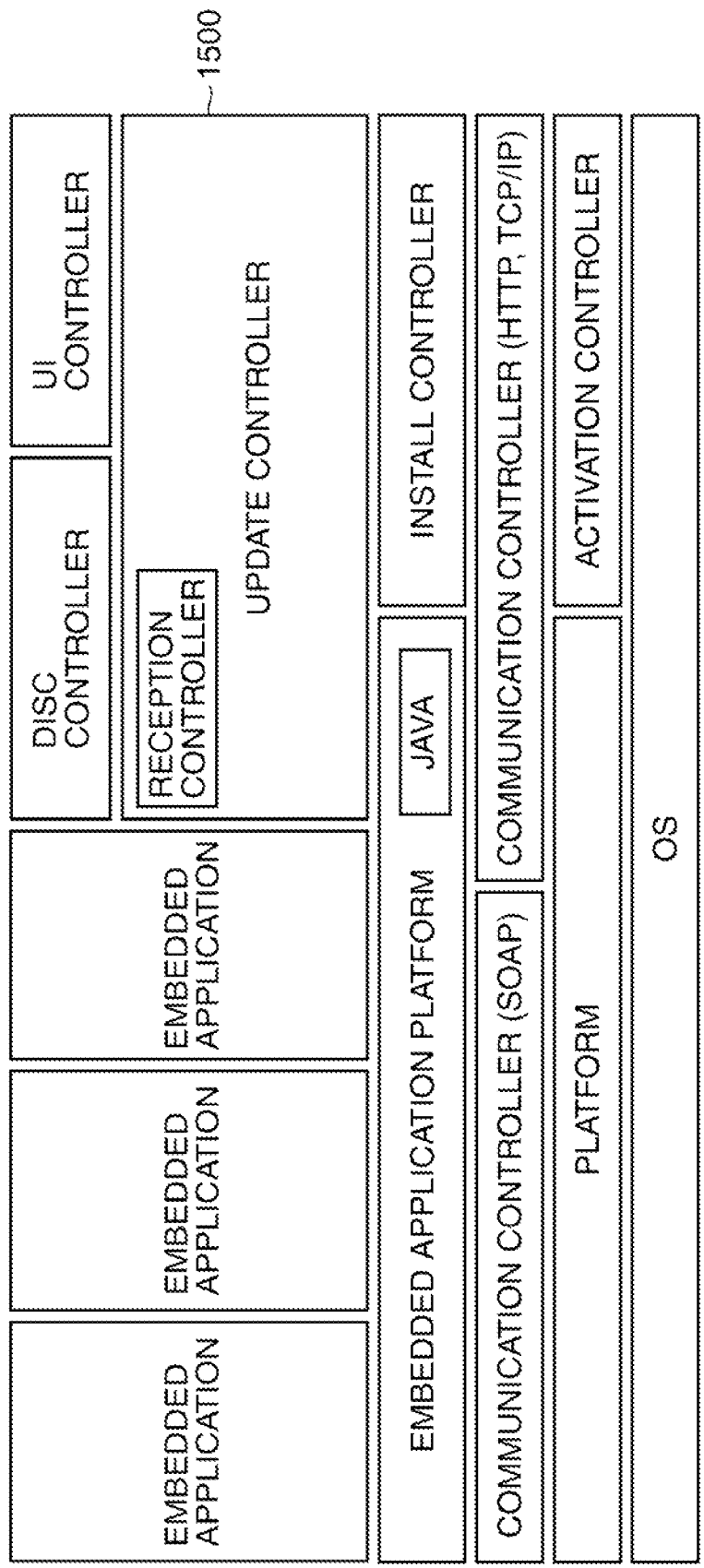
FIG. 14 is a view showing a software structure of each image forming apparatus.

The update control process is executed by an update controller 1500 shown in FIG. 14. FIG. 14 shows a software structure of each image forming apparatus. The software structure of FIG. 8 operates on the software structure shown in FIG. 14. The software structure of FIG. 14 is read from the HDD 414 to the RAM 413 of the image forming apparatus and executed by the CPU 411 that achieves functions of the update controller 1500.

Figure 15:
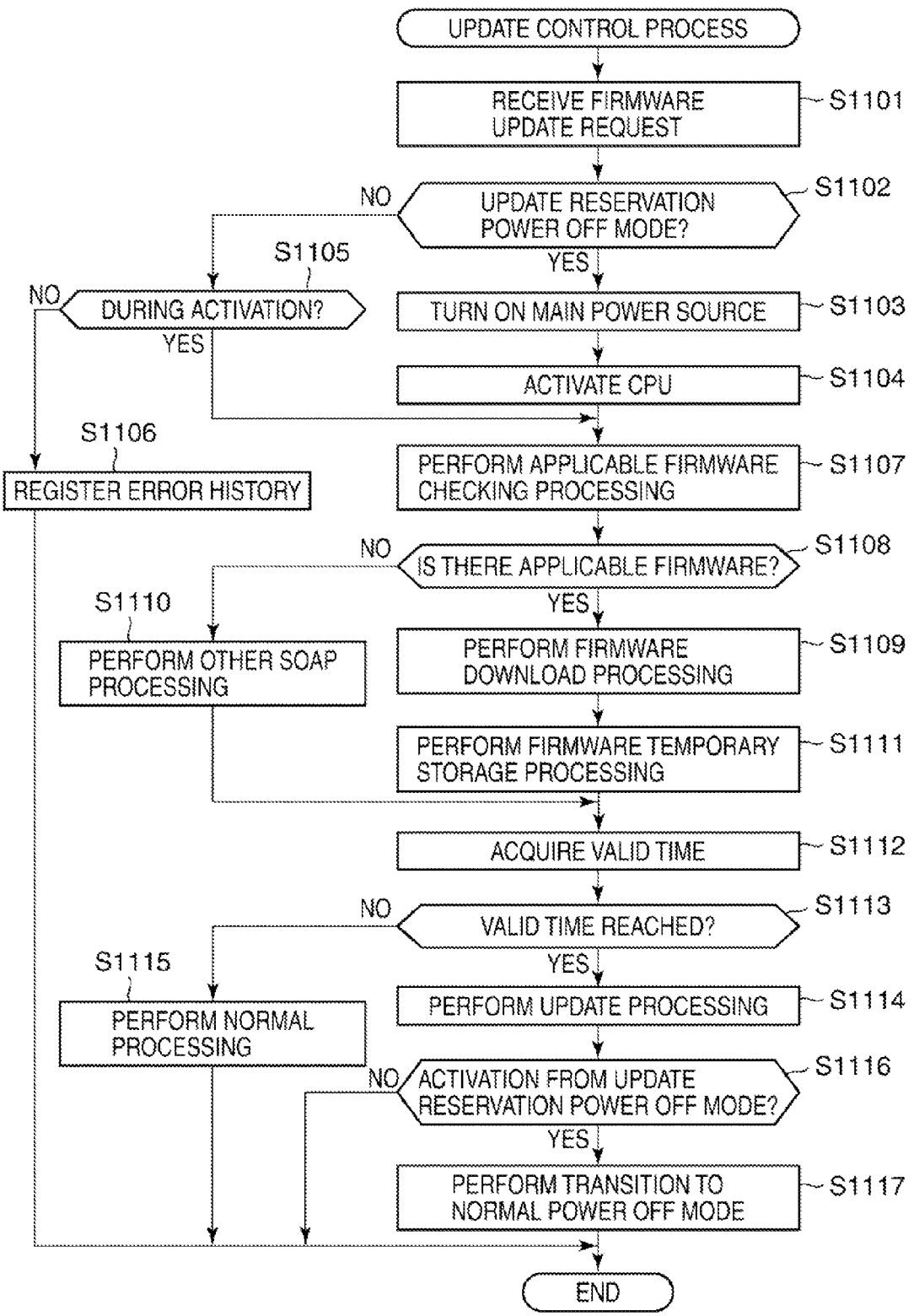
FIG. 15 is a flowchart showing procedures of an update control process performed by each image forming apparatus.

FIG. 15 shows, in flowchart, procedures of the update control process performed by each image forming apparatus.

In the update control process of FIG. 15, the network I/F 417 receives a firmware update request (update request) from the monitoring unit (step S1101). Next, it is determined whether or not the image forming apparatus is in the update reservation power off mode (step S1102). If the answer to step S1002 is YES, the main power source 503 is turned ON (step S1103), whereby the CPU 411 is activated (step S1104). It should be noted that when the image forming apparatus is in the update reservation power off mode, packets other than the firmware update request packet are all discarded or rejected.

Next, applicable firmware checking processing is performed to transmit SOAP data having the content shown in FIG. 12, receive SOAP data having the content shown in FIG. 13, and check whether the latest distributable firmware is registered in the distribution server 31 (step S1107). It should be noted that the term "firm" in FIGS. 12 and 13 is abbreviation of firmware. The SOAP data of FIG. 12 includes a current firm component information list in which the type and version of firmware of the image forming apparatus are indicated. The distribution server 31 computes the latest firmware information about the image forming apparatus based on the SOAP data of FIG. 12 and transmits to the image forming apparatus the SOAP data of FIG. 13 generated based on the computed information. In FIG. 13, there is shown a "firm group version" field in which the latest version for the entire firmware structure is indicated.

Based on the SOAP data of FIG. 13 that represents a result of the applicable firmware checking processing, whether or not there is an applicable firmware is determined (step S1108). If there is an applicable firmware (i.e., if YES to step S1108), firmware download processing is performed to specify the distribution server 31 or an equivalent server and sequentially download all necessary firmware components from the specified server (step S1109). Then, firmware temporary storage processing is performed to store the downloaded firmware components into the HDD 414 (step S1111). If there is no applicable firmware (i.e., if NO to step S1108), other SOAP processing is performed (step S1110).

Next, the valid time to apply firmware which has been set on the setting screen shown in FIG. 11 is acquired (step S1112), and whether or not the valid time is reached is determined (step S1113).

If the valid time is reached (i.e., if YES to step S1113), firmware update processing is performed to update the firmware of the image forming apparatus by using the firmware components stored in the HDD 414 (step S1114). On the other hand, if the valid time is not reached (i.e., if NO to step S1113), normal processing is performed (step S1115) and the present process is completed.

Next, whether or not the image forming apparatus is activated from the update reservation power off mode is determined (step S1116). If the answer to step S1116 is YES, a transition is made to the normal power off mode where shutdown control is performed and the main power source 503 and the sub power source 502 are turned off (step S1117), and the present process is completed. On the other hand, if the image forming apparatus is not activated from the update reservation power off mode (i.e., if NO to step S1116), the present process is completed.

If it is determined in step S1102 that the image forming apparatus is not in the update reservation power off mode (i.e., if NO to step S1102), whether or not the image forming apparatus is being activated is determined (step S1105). If the answer to step S1105 is YES, the process proceeds to step S1107 described above. On the other hand, if it is determined that the image forming apparatus is not being activated (i.e., if NO to step S1105), an error history is registered into the distribution server 31 (step S1106) since there is a possibility that the image forming apparatus is not normally activated for the reason, for example, that the image forming apparatus is in the normal power OFF state, whereupon the present process is completed.

According to the above-described embodiment, in a case where the image forming apparatus is in the power switch off state in which the power switch operable by the user is turned off and where the setting to permit execution of firmware update has been set by the user, the image forming apparatus stops power supply for execution of processing other than the processing to be performed by the network I/F 417. When the network I/F 417 receives a firmware update request packet, the image forming apparatus restores power supply for execution of the firmware update processing, and the update processing is executed. It is therefore possible to execute the firmware update, even if the power switch of the image forming apparatus is at OFF. In other words, the firmware update can be performed, while reducing power consumption.

OTHER EMBODIMENTS

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2011-097296, filed Apr. 25, 2011, which is hereby incorporated by reference herein in its entirety.

What is claimed is:

1. An image forming apparatus capable of executing printing, comprising:
a processor; and
a storage device, the processor configured to execute computer executable instructions recorded on the storage device, the computer executable instructions including instructions, that when executed, cause the image forming apparatus to:
execute update processing for updating firmware of the image forming apparatus;
display a setting screen through which a user sets an update schedule of executing the update processing for updating the firmware of the image forming apparatus;
accept a transition instruction for transitioning a state of the image forming apparatus;
determine, in a case where the transition instruction is accepted, whether or not the update schedule is set by the user; and
transition the state of the image forming apparatus to a power OFF state, in a case where the update schedule is determined not to be set by the user, and to transition the state of the image forming apparatus to a power saving state which is different from the power OFF state in a case where the update schedule is determined to be set by the user.

2. The image forming apparatus according to claim 1, wherein the computer executable instructions further include instructions, that when executed, cause the image forming apparatus to:
execute the update processing based on the latest firmware acquired from an external apparatus on a network connected to a communication device of the image forming apparatus,
in the power saving state, supply power to the communication device, and
in the power OFF state, not supply the power to the communication device.

3. The image forming apparatus according to claim 2, wherein the computer executable instructions further include instructions, that when executed, cause the image forming apparatus to, in a case where the update schedule is determined to be set by the user, transfer, using the communication device, a packet accepted from a specific device to a controller of the image forming apparatus and to discard a packet other than the packet accepted from the specific device.

4. The image forming apparatus according to claim 3, wherein the computer executable instructions further include instructions, that when executed, cause the image forming apparatus to receive, from the specific device, an execution request for executing the update processing.

5. The image forming apparatus according to claim 1, wherein the computer executable instructions further include instructions, that when executed, cause the image forming apparatus to execute the update processing in accordance with the update schedule, after the state of the image forming apparatus transitions to the power saving state.

6. The image forming apparatus according to claim 5, wherein the computer executable instructions further include instructions, that when executed, cause the image forming apparatus to, in a case where the update processing is executed in accordance with the update schedule after the state of the image forming apparatus transitions to the power saving state, transition the state of the image forming apparatus to the power OFF state.

7. The image forming apparatus according to claim 1, further comprising a power switch operable by the user to input the transition instruction.

8. A method, comprising:
executing update processing for updating firmware of an image forming apparatus;

displaying a setting screen through which a user sets an update schedule of executing the update processing for updating the firmware of the image forming apparatus;

accepting a transition instruction for transitioning a state of the image forming apparatus;

determining, in a case where the transition instruction is accepted, whether or not the update schedule is set by the user; and transitioning the state of the image forming apparatus to a power OFF state, in a case where it is determined that the update schedule is not set by the user, and transitioning the state of the image forming apparatus to a power saving state different from the power OFF state in a case where it is determined that the update schedule is set by the user.

9. A non-transitory computer-readable storage medium storing a program for causing a computer to execute a method, the method comprising:

executing update processing for updating firmware of an image forming apparatus;

displaying a setting screen through which a user sets an update schedule of executing the update processing for updating the firmware of the image forming apparatus;

accepting a transition instruction for transitioning a state of the image forming apparatus;

determining, in a case where the transition instruction is accepted, whether or not the update schedule is set by the user; and transitioning the state of the image forming apparatus to a power OFF state, in a case where it is determined that the update schedule is not set by the user, and transitioning the state of the image forming apparatus to a power saving state different from the power OFF state in a case where it is determined that the update schedule is set by the user.

\* \* \* \* \*